(12) United States Patent
Ito

(10) Patent No.: US 6,671,996 B1
(45) Date of Patent: Jan. 6, 2004

(54) LURE

(75) Inventor: Kiyoshi Ito, Aichi (JP)

(73) Assignee: Bassday Co., Ltd., Toyokawa (JP)

( * ) Notice: Subject to any disclaimer, the term of this patent is extended or adjusted under 35 U.S.C. 154(b) by 0 days.

(21) Appl. No.: 10/202,144

(22) Filed: Jul. 23, 2002

(51) Int. Cl.[7] .............................................. A01K 85/00
(52) U.S. Cl. ..................... 43/42.31; 43/42.39
(58) Field of Search .............. 43/42.31, 42.35, 43/42.36, 42.39, 42.02

(56) References Cited

U.S. PATENT DOCUMENTS

| | | | | |
|---|---|---|---|---|
| 4,761,910 A | * | 8/1988 | Ninomiya | 43/42.31 |
| 4,920,685 A | * | 5/1990 | Landuydt | 43/42.04 |
| 5,926,995 A | * | 7/1999 | Dubois | 43/42.31 |
| 5,992,084 A | * | 11/1999 | Kitagawa | 43/42.31 |
| 6,301,822 B1 | * | 10/2001 | Zernov | 43/42.31 |

FOREIGN PATENT DOCUMENTS

| | | | | |
|---|---|---|---|---|
| JP | 3-15021 | 4/1991 | .......... | A01K/85/00 |
| JP | 6-79263 | 11/1994 | .......... | A01K/85/00 |
| JP | 7-3889 | 2/1995 | .......... | A01K/85/00 |
| JP | 7-30667 | 6/1995 | .......... | A01K/85/00 |
| JP | 10-327708 | 12/1998 | .......... | A01K/85/00 |
| JP | 3017727 | 12/1999 | .......... | A01K/95/00 |
| JP | 3143420 | 12/2000 | .......... | A01K/85/00 |
| JP | 2001-299150 | 10/2001 | .......... | A01K/85/00 |

* cited by examiner

*Primary Examiner*—Charles T. Jordan
*Assistant Examiner*—Kimberly S. Smith
(74) *Attorney, Agent, or Firm*—Darby & Darby

(57) ABSTRACT

A member for displacing the center of gravity used in a lure. The longitudinal dimension of a linear wire extends from the belly of the lure to the tail. A cylindrical magnet piece is secured to one end of the wire. A weight is formed as a hollow cylinder and is inserted from the other end of the wire. This weight is an alloy formed by mixing a material that does not have ferromagnetic properties in room temperature and a material having ferromagnetic properties at room temperature. A hole of the weight is formed to have a diameter slightly larger than that of the wire, allowing the wire passed through the hole to move freely forward and back. Next, a cushion member is secured near the other end of the wire.

6 Claims, 8 Drawing Sheets

Fig. 8(a)  Fig. 8(b)

LURE

BACKGROUND OF THE INVENTION

1. Field of the Invention

The present invention relates to a lure formed with a fishing hook and a fake bait shaped to resemble a small fish.

2. Discussion of the Related Art

Conventionally, as shown in FIG. 10, in the type of lures referred to as plugs, a spherical weight 2 formed from lead, brass, or tungsten, is movably disposed within an internal space 6 of a main lure unit 1. Balance is maintained when the lure is pulled underwater by having weight 2 fit into a cavity 3 in the main lure unit 1. When the lure is cast, weight 2 disengages from the cavity 3 and moves to the tail of the lure, thus making the lure easier to cast.

FIG. 11 illustrates a prior art lure having a magnetic piece 4, secured toward the head of internal space 6 of main lure unit 1. Magnetic piece 4 prevents movement of a weight 2a, which provides balance when the lure is moving underwater. Spherical weight 2a is formed from a magnetic material and can disengage from the magnetic piece 4 so that it can move in internal space 6.

Inside the lure shown in FIG. 12, a spherical weight 2b is formed from a magnet. A steel piece 5 is secured toward the head of the lure on a bottom section internal space 6 of main lure unit 1. Weight 2b can attach and detach from steel piece 5 and can move inside internal space 6.

Inside the lure shown in FIG. 13, a hole 2d is formed along the axis (or center) of a cylindrical (or spherical) weight 2c. A stainless steel wire 7 is inserted through hole 2d, and the ends of this wire 7 are secured longitudinally in internal space 6 of main lure unit 1. When the lure is cast, weight 2c moves toward the tail of the main lure unit 1, increasing the casting distance. When the lure moves in the water, weight 2c moves to the center of main lure unit 1 to provide balanced motion.

However, the conventional lure shown in FIG. 10, spherical weight 2 has difficulty fitting into cavity 3 when it is reeled in immediately after casting. This leads to discrepancies in the motion of the lure. The prior art lure shown in FIG. 11, weight 2a is spherical, thus maintaining a certain specific gravity requires increasing the volume. This makes it difficult for weight 2a to move to the tail of main lure unit 1. Similarly, in the prior art lure shown in FIG. 12, it is difficult for spherical weight 2b, formed from a magnetic material, to move to the tail of main lure unit 1. Weights 2, 2a, 2b of the conventional lures shown in FIGS. 10–12 are spherical and move by rotating in internal space 6. Noise will tend to result when the weight impacts a partition wall 6a that partitions the internal space. The lure shown in FIG. 13 includes means for securing the weight to roughly the center position of the main lure unit, but maintaining stable motion of the lure in the water is difficult.

OBJECTS AND SUMMARY OF THE INVENTION

It is the foregoing and various other drawbacks of the prior art which the present invention seeks to overcome by providing a lure that reduces noise created by displacement of the weight inside the main lure unit and that allows for stable motion in the water.

The present invention provides a lure including a wire disposed longitudinally inside a main lure unit. A weight is loosely supported on the wire and slides along the wire. This weight is formed from an alloy made from a material that is ferromagnetic at room temperature and a material that is not ferromagnetic at room temperature. A magnet piece is secured to the front end (toward the head of the lure) of the wire.

According to a first embodiment of the present invention, the weight in the lure is formed from an alloy having a specific gravity of about 12 to about 20.

According to a second embodiment of the present invention, the material in the weight that is not ferromagnetic at room temperature is tungsten or a tungsten alloy.

The present invention also provides a lure in which a wire is disposed longitudinally inside a main lure unit. A weight is loosely supported on the wire and slides along the wire. The weight is formed with a material having a high specific gravity of about 12 to about 20 secured to the rear of a magnet piece disposed toward the lure head. The front end (toward the lure head) of the wire is secured to a steel piece.

A third embodiment of the present invention includes the material with a high specific gravity is tungsten or a tungsten alloy.

Another embodiment of the present invention includes a cushion member secured to the rear end of the wire (toward the tail of the lure). The weight collides with the cushion member.

A fifth embodiment of the present invention includes a curved wire.

The present invention provides a lure in which a wire is disposed longitudinally inside a main lure unit, and a weight is loosely supported on the wire so that it can slide along the wire. This weight is formed from an alloy containing a material with ferromagnetic properties at room temperature and a material with no ferromagnetic properties at room temperature. A magnet piece is secured to the front end (toward the head of the lure) of the wire. Thus, noise resulting from the displacement of the weight inside the main lure unit is prevented. Since the weight is secured to the magnet piece in the water, the lure can move in a stable manner in the water.

The weight in the lure is formed from an alloy with a specific gravity of about 12 to about 20. This allows the volume of the lure to be decreased, and the weight can move closer toward the tail of the main lure unit. As a result, the lure allows an increased casting distance.

Furthermore, the present invention provides a lure in which the material in the weight that does not have ferromagnetic properties at room temperature is tungsten or a tungsten alloy.

Also, the present invention provides a lure formed with a wire extending longitudinally inside the main lure unit, and a weight is loosely supported on the wire so that it can slide along the wire. A material with a high specific gravity of about 12 to about 20 is secured behind a magnet piece on the weight positioned toward the head of the lure. A steel piece is secured to the front end (toward the head of the lure) of the wire. This prevents noise generated from displacement of the weight inside the main lure unit. In the water, the steel piece is secured to the weight so that the lure is able to move in a stable manner in the water.

Furthermore, the present invention provides a lure in which the material with high specific gravity in the weight is tungsten or a tungsten alloy.

Also, the present invention provides a lure in which a cushion member that impacts the weight is secured to the rear end of the wire (tail end of the lure). This prevents damage to the inside of the main lure unit during casting caused by the weight being displaced rapidly to the tail of the lure.

Furthermore, the present invention provides a lure with a curved wire. This provides the advantages of the present invention even when the longitudinal dimension of the lure is small.

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

BRIEF DESCRIPTION OF THE DRAWINGS

FIGS. 8(a) and 8(b) are perspective views illustrating a member for displacing the center of gravity of a lure in two different stages according to another embodiment of the present invention;

DETAILED DESCRIPTION OF THE PREFERRED EMBODIMENTS

Figure 1:
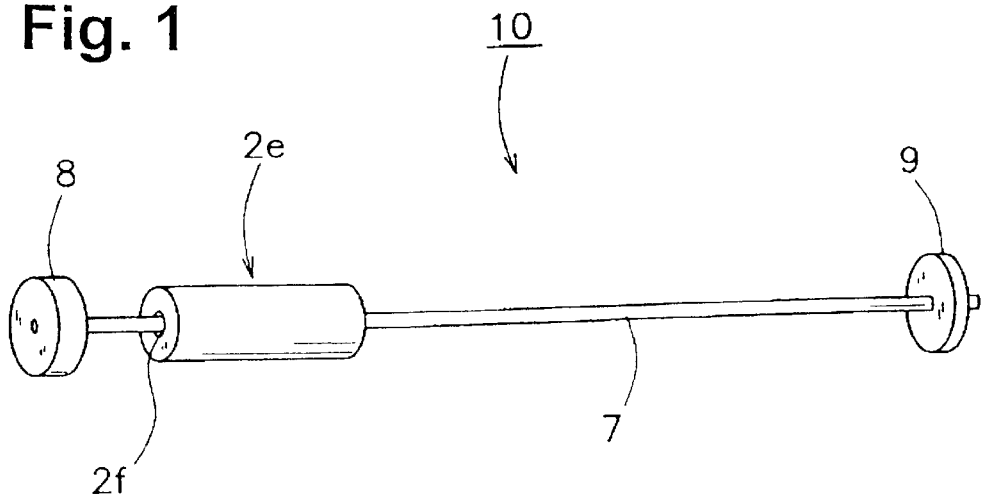
FIG. 1 is a perspective view illustrating a member for displacing the center of gravity a lure according to the first embodiment of the present invention.
Figure 2:
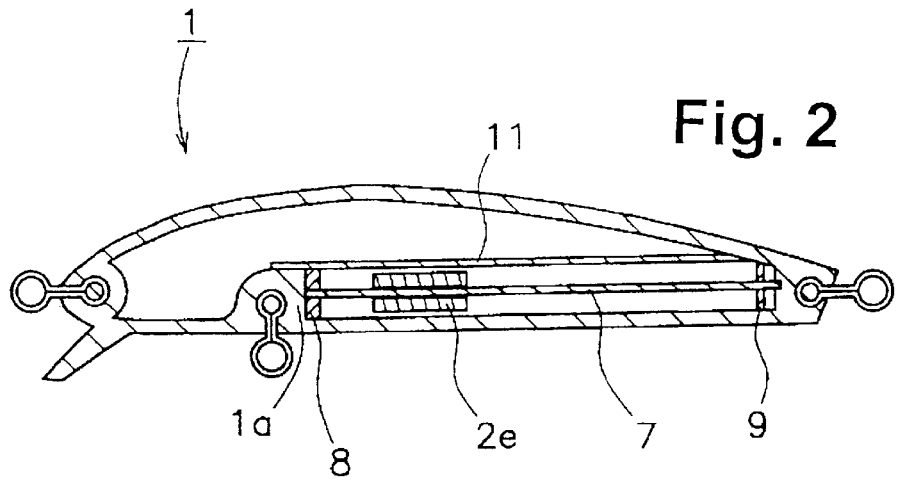
FIG. 2 is a cross-sectional perspective view of the lure according to a first embodiment of the present invention.

Referring now to FIGS. 1 and 2 illustrating a member for displacing the center of gravity of a lure used in a first embodiment according to the present invention. The longitudinal dimension of a linear wire 7 extends from the belly of the lure to the tail, and a wire such as a stainless steel wire or a phosphor bronze wire having a diameter of about 0.6 mm to about 2 mm is used. A cylindrical magnet piece 8 is secured to one end of wire 7. Wire 7 and magnet piece 8 can be secured by screwing together female threads formed on the cylindrical inner surface of magnet piece 8 and male threads formed at an end of wire 7. Alternatively, wire 7 can be inserted in the cylindrical interior of magnet piece 8 and then welded or secured with an adhesive or other methods may be used. Next, a weight 2e is formed as a hollow cylinder and is inserted from the other end of wire 7. Weight 2e is an alloy formed by mixing a material that does not have ferromagnetic properties in room temperature (e.g., tungsten) and a material having ferromagnetic properties at room temperature (e.g., iron). This alloy is used to form a cylinder having a specific gravity of about 12 to about 20, and preferably between about 14 to about 18.5. A hole 2f is formed in weight 2e to have a diameter slightly larger than that of wire 7, allowing wire 7 to pass through hole 2f and move freely forward and back. Next, a cushion member 9 is secured near the other end of wire 7. Cushion member 9 can be formed by a material such as foam urethane, silicon rubber, or cork.

FIG. 2 illustrates how the member for displacing the center of gravity 10 shown in FIG. 1 is assembled into the lure. A space for housing the member for displacing the center of gravity 10 is formed inside a main lure unit 1 with a partition wall 11. Member for displacing the center of gravity 10 is mounted into this space. The securing of the member for displacing the center of gravity 10 is achieved by using an adhesive or other securing means known by those skilled in the art to secure a section of magnet piece 8 to an inner wall 1a of main lure unit 1 or partition wall 11. With regard to the end of cushion member 9, a side surface of cushion member 9 is secured to a side surface of main lure unit 1 or the end of the wire can be secured to main lure unit 1. Thus, when the lure is cast, the rear end of weight 2e moves along wire 7 until it comes into contact with cushion member 9, allowing the casting distance to be increased. Conversely, in the water, the magnetic force of magnet piece 8 will cause the front end of weight 2e to be attracted to magnet piece 8 so that the motion of the lure in the water is stabilized.

Figure 3:
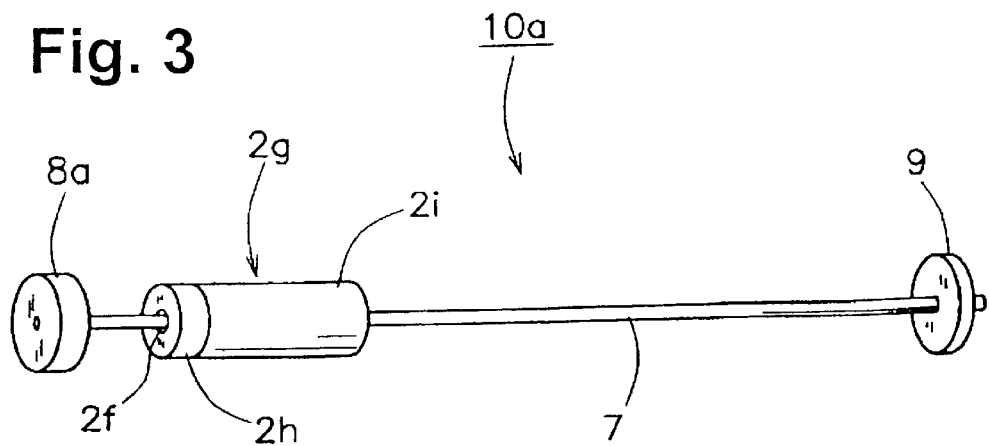
FIG. 3 is a perspective view illustrating a member for displacing the center of gravity of a lure according to a second embodiment of the present invention.

FIG. 3 illustrates a second embodiment of a member for displacing the center of gravity used in a lure according to the present invention. Linear wire 7 is disposed in a member for displacing the center of gravity 10a, and wire 7 is the same as the one used in FIG. 1. A cylindrical steel piece 8a is formed at one end of wire 7. The securing of wire 7 and steel piece 8a is performed in the same manner as the securing of wire 7 and magnet piece 8 from FIG. 1. Next, a weight 2g is formed as a hollow cylinder and is inserted from the unsecured end of wire 7. Weight 2g is formed by adhesing a cylindrically shaped magnet piece 2h to an end of a material 2i having a high specific gravity (e.g., a tungsten alloy). This forms a cylinder having a specific gravity of about 12 to about 20, and preferably about 14 to about 18.5. Weight 2g is formed with hole 2f having a diameter slightly larger than that of wire 7. A surface of steel piece 8a is secured to the end of wire 7. Magnet piece 2h has only a slight attraction to steel piece 8a, so that it can move forward and back. Next, a cushion member 9, similar to that of the first embodiment, is secured near the other end of wire 7.

Figure 4:
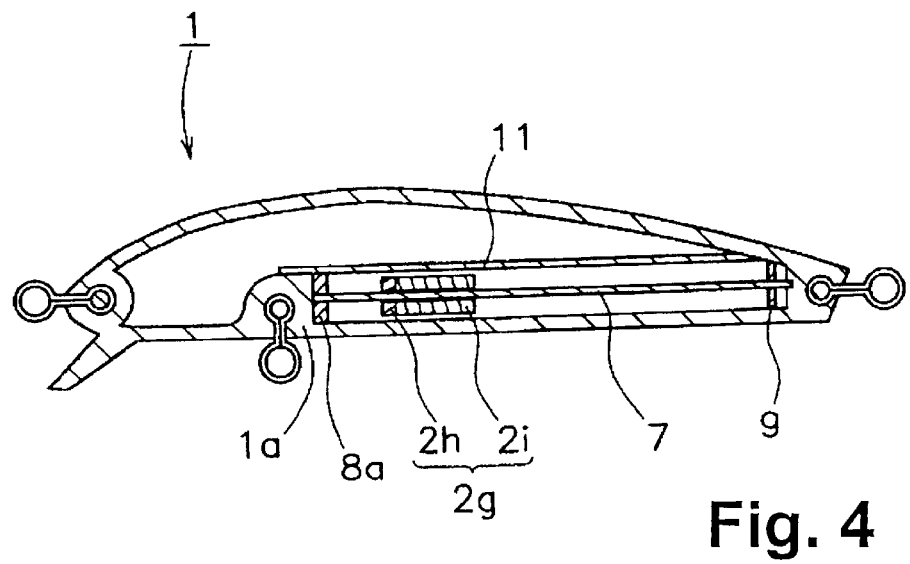
FIG. 4 is a cross-sectional of the lure according to a second embodiment the present invention.

Referring now to FIG. 4, illustrating the member for displacing the center of gravity 10a from FIG. 3 mounted inside the lure. The mounting of the member is done in a manner similar to that of the first embodiment described above. The rear end tungsten alloy 2i of weight 2g moves along wire 7 until it comes into contact with cushion member 9, this allows the casting distance of the lure to be increased. Conversely, once the lure is in the water, the magnetic force of magnet piece 2h causes magnet piece 2h to be attracted to steel piece 8a so that the motion of the lure is stabilized.

Figure 5A:
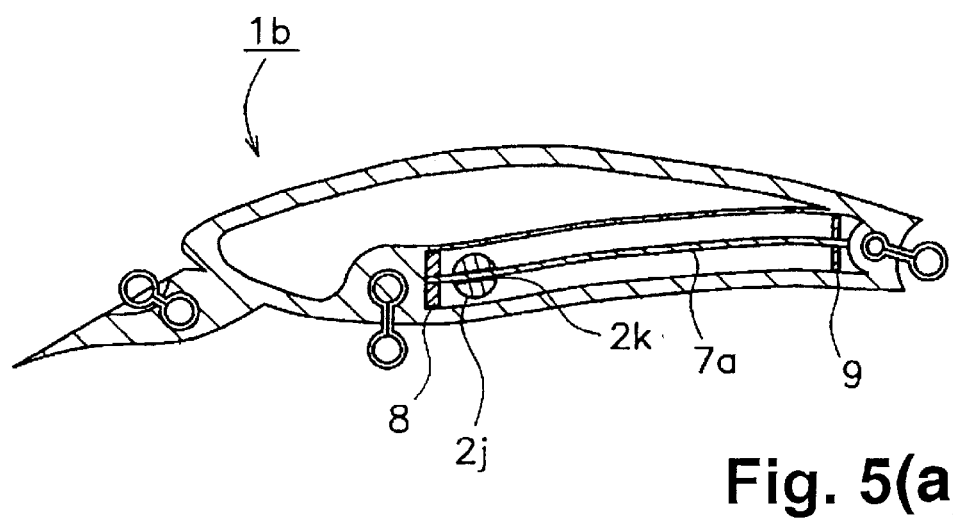
FIG. 5(a) is a cross-sectional view of another embodiment of a lure according to the present invention.

FIG. 5(a) illustrates another embodiment of a lure according to the present invention. A main lure unit 1b is smaller than the main lure unit 1 described above. As shown in FIG. 5(a), a wire 7a is formed with a gentle curve rather than a linear shape, and magnet piece 8 is secured to an end of wire 7a. A weight 2j is formed from a tungsten alloy containing spherical iron particles. In this case, a hole 2k formed in weight 2j is slightly larger than hole 2f used for linear wire 7 described above. This allows weight 2j to be loosely supported so that weight 2j can be smoothly displaced between cushion member 9, secured near the rear end of wire 7a and magnet piece 8 secured to the other end.

Figure 6A:
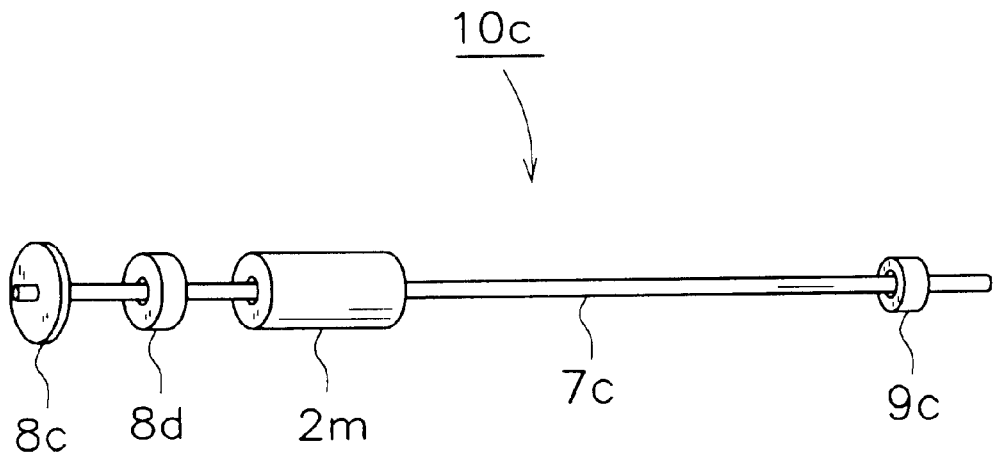
FIG. 6(a) is a perspective view illustrating a member for displacing the center of gravity of a lure according to another embodiment of the present invention.
Figure 6B:
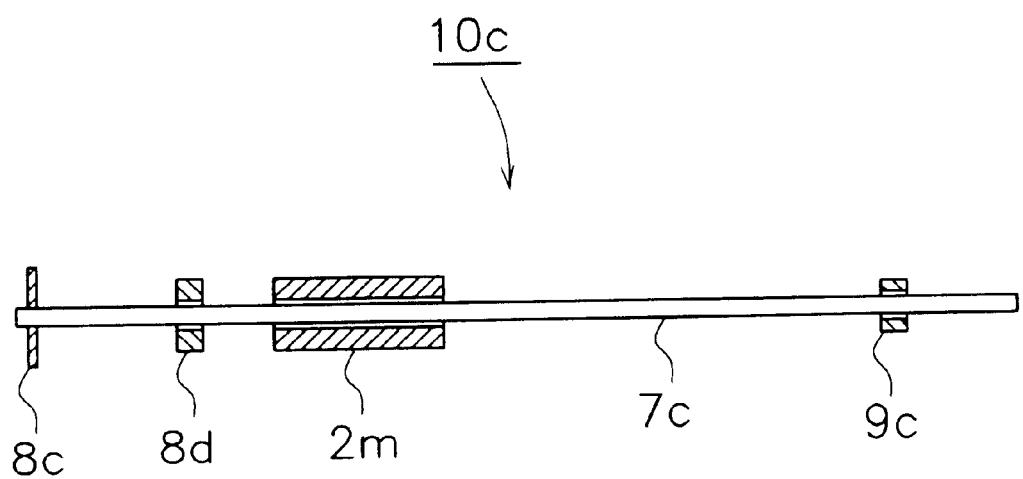
FIG. 6(b) is a cross-sectional view of a member for displacing the center of gravity of a lure according to FIG. 6(a)

Referring now to FIGS. 6(a) and 6(b), a member for displacing the center of gravity 10c, a metal plate (metal piece) 8c secured to the end of a wire 7c. Wire 7c is formed from a material that is not ferromagnetic at room temperature. Metal plate 8c, a magnet 8d, a weight 2m, and a cushion member 9c are supported on wire 7C respectfully from frame to tail. The material without ferromagnetic properties used in wire 7c can be phosphor bronze or stainless steel, but it would also be possible to use a Ni—Cr alloy or a shape-memory alloy. Also, weight 2m is formed from a tungsten alloy containing about 1% to about 15% iron. In this preferred embodiment, powder metallurgy is used to form weight 2m, which contains nickel in addition to tungsten and iron. Cushion member 9c is a cushion rubber formed from a synthetic rubber. Magnet, 8d weight 2m, and cushion member 9c are all supported on wire 7c and are all formed with holes at the center that allow wire 7c to pass through (see FIG. 6(a)).

Figure 7A:
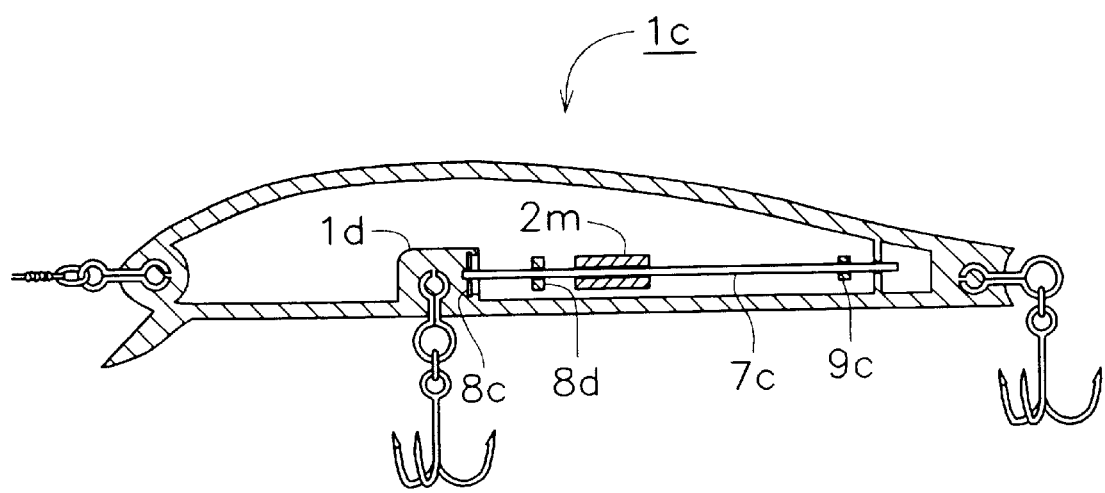
FIGS. 7(a) and 7(b) are cross-sectional views of a lure with the member for displacing the center of gravity in motion according to an embodiment of the present invention.
Figure 7B:
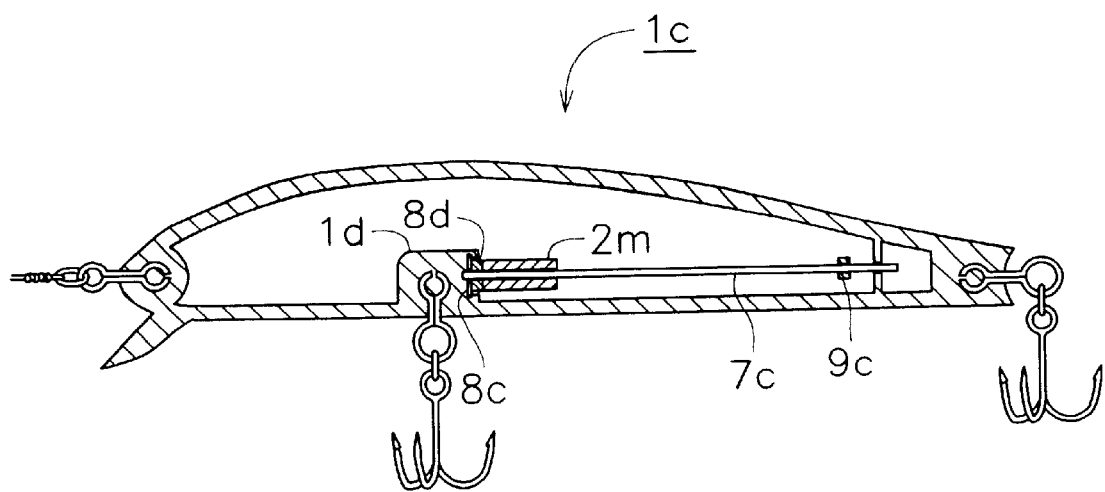

Referring now to FIGS. 7(a) and 7(b), a lure 1c including member for displacing the center of gravity 10c is formed so an axis of wire 7c is aligned with the longitudinal direction (from the head to the tail) of lure 1c. Metal plate (metal piece) 8c is secured to the end of wire 7c. Metal plate (metal piece) 8c is embedded in an inner wall 1d approximately at the center of lure 1c. The other end of wire 7c is secured to the rear end (toward the tail) of lure 1c. Metal plate (metal piece) 8c is embedded in inner wall 1d. Inner wall 1d has a section of its surface exposed inside lure 1c so that it can abut magnet 8d supported by wire 7c. When magnet 8d slides forward, it can abut metal plate (metal piece) 8c and be magnetically attached.

Since weight 2m contains a small amount of iron, the abutting of magnet 8d against weight 2m will result in magnetic attachment. Thus, as shown in FIG. 7(b), the sliding of weight 2m toward the front (head) of lure 1c causes it to be magnetically attached to magnet 8d. Weight 2m attached in this manner then slides further to metal plate (metal piece) 8c. Magnet 8d is then attached magnetically to metal plate (metal piece) 8c, and weight 2m is kept in the vicinity of the metal plate (metal piece) 8c. Also, if magnet 8d is already magnetically attached to metal plate (metal piece) 8c, the displacement of weight 2m to magnet 8d causes magnet 8d to magnetically attach to weight 2m as well, thus keeping weight 2m near the center of lure 1c.

As shown in FIGS. 8(a) and 8(b), the attachment of magnet 8d to weight 2m or metal plate (metal piece) 8c is disengaged when gravity acts on the weight 2m in the direction away from metal plate (metal piece) 8c. In this case, magnet 8d magnetically attaches to either metal plate (metal piece) 8c or weight 2m depending on which has the stronger magnetic attraction Thus, there may be cases where magnet 8d becomes integral with metal plate (metal piece) 8c and only weight 2m moves toward cushion member 9c (FIG. 8(a)), and there may be cases where magnet 8d becomes integral with weight 2m and both weight 2m and magnet 8d go toward the cushion member 9c together (FIG. 8(b)).

Figure 8C:
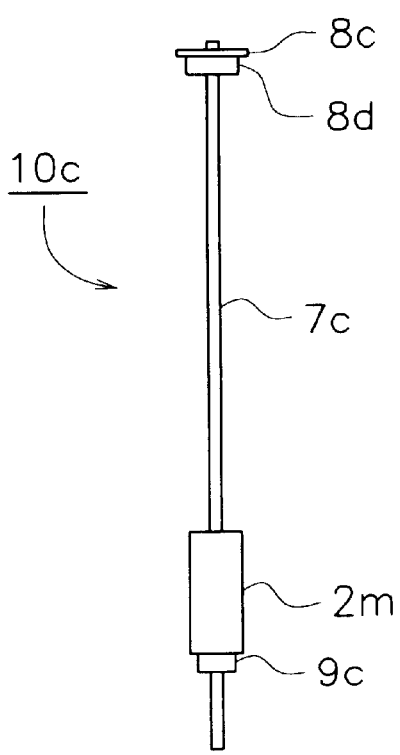
FIG. 8(c) is a perspective view illustrating a member for displacing the center of gravity of a lure according to another embodiment of the present invention.
Figure 8C:
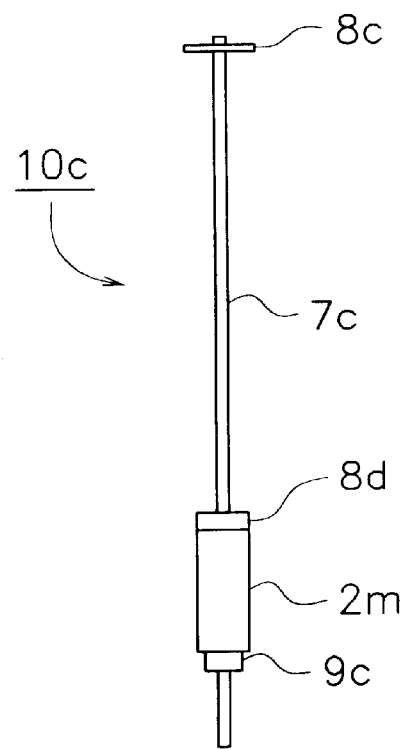
Figure 8C:
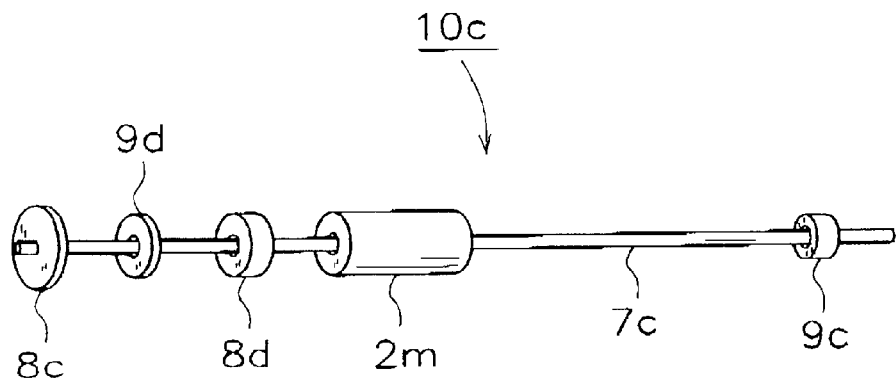

Referring to FIG. 8(c), to allow weight 2m and magnet 8d to be formed integrally, a thin plastic plate 9d that is non-magnetic can be interposed between metal plate (metal piece) 8c and magnet 8d. Plastic plate 9d also serves as a shock-absorbing member.

Figure 9A:
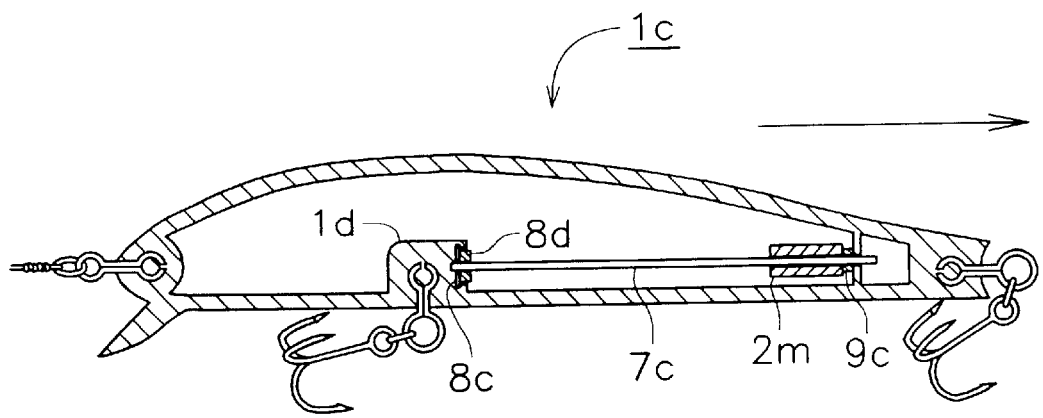
FIG. 9(a) is a cross-sectional view of a lure utilizing the member for displacing the center of gravity as illustrated in FIG. 8(a), according to the present invention.
Figure 9B:
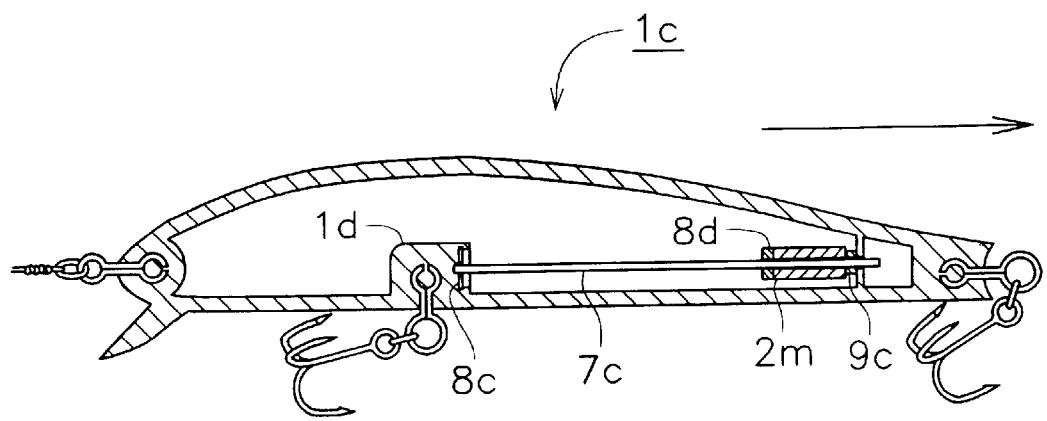
FIG. 9(b) is a cross-sectional view of a lure utilizing the member for displacing the center of gravity as illustrated in FIG. 8(b), according to the present invention.
Figure 10:
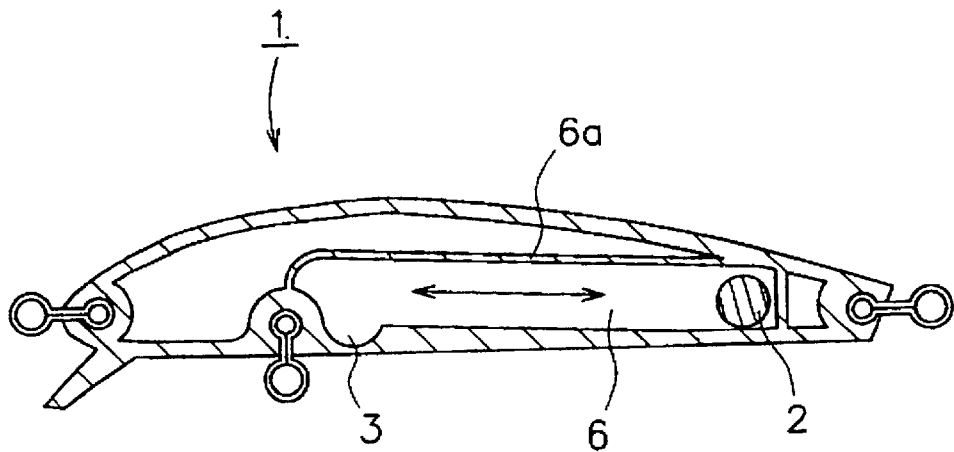
FIG. 10 is a cross-sectional illustration of a conventional lure.
Figure 11:
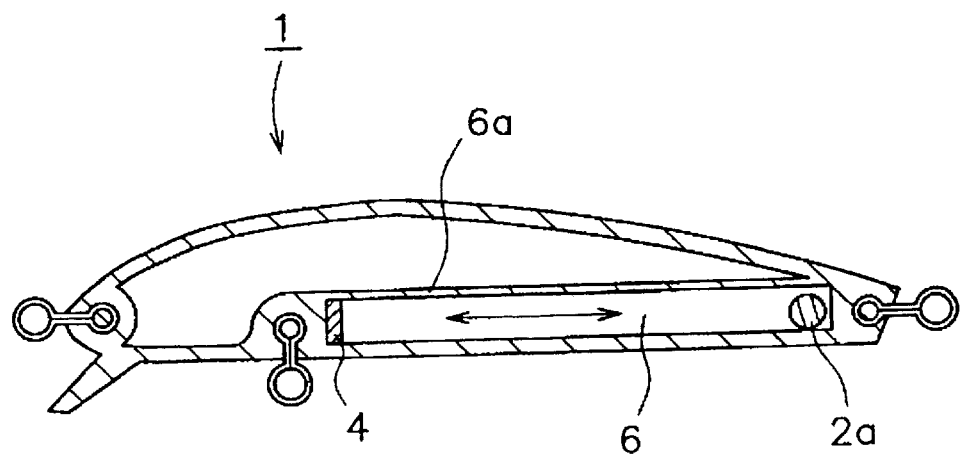
FIG. 11 is a cross-sectional illustration of another a conventional lure.
Figure 12:
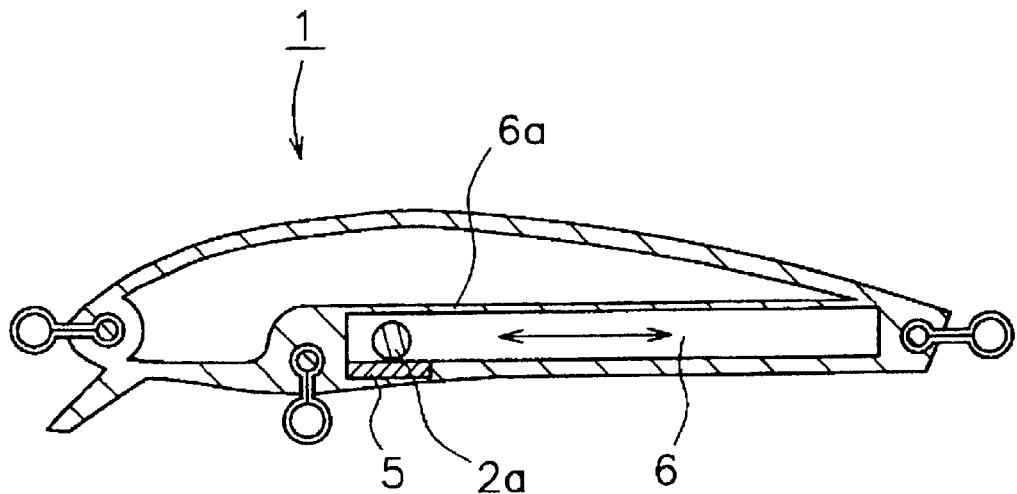
FIG. 12 is a cross-sectional illustration of a third conventional lure.
Figure 13:
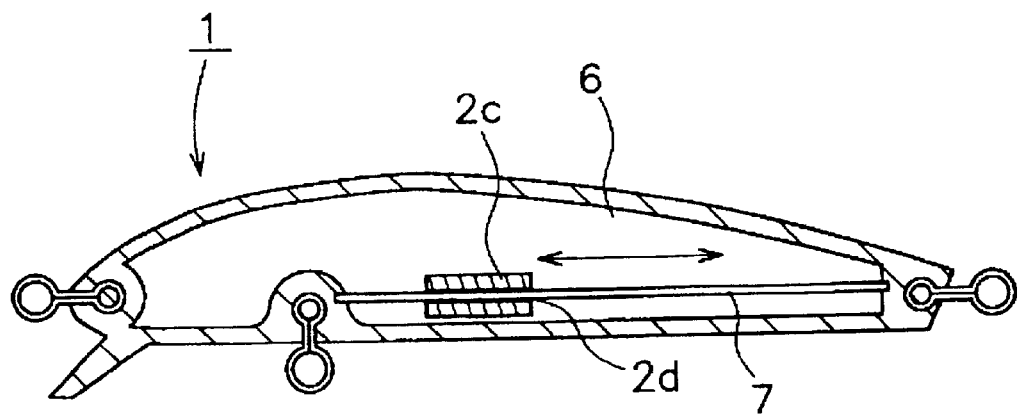
FIG. 13 is a cross-section drawing showing a fourth conventional lure.

The different ways magnet 8d can travel toward the cushion member 9c can differ when the lure is being cast, as shown in FIGS. 9(a) and 9(b). If metal plate (metal piece) 8c has stronger magnetic attraction, magnet 8d stays attached to metal plate (metal piece) 8c. Thus, during casting, only weight 2m moves toward the rear (toward the tail), as shown in FIG. 9(a), thus providing stable travel during casting.

If weight 2m has stronger attraction, magnet 8d stays connected with weight 2m so that, as shown in FIG. 9(b), weight 2m and magnet 8d move back toward the tail together during casting, thus providing stable travel.

If metal plate (metal piece) 8c and weight 2m have the same degree of magnetic attraction, the magnet will either attach to metal plate (metal piece) 8c and stay at the center of lure 1c or will attach to weight 2m. Since lure 1c receives various types of shocks during casting, magnet 8d will tend to end up moving toward weight 2m, pulled by its own weight, even if it was attached to metal plate (metal piece) 8c.

When a sliding weight attracted by a magnet that restricts sliding, the magnet does not have to be secured permanently to either the inner wall of the lure or the weight. Thus, where the magnet is secured can be left up to whichever has the stronger magnetic attraction of either the weight or the metal plate (metal piece). Thus, if a non-iron metal is to be used or is to be contained in the weight or the metal plate (metal piece), the degree of magnetic attraction thereof must be carefully considered.

Figure 5B:
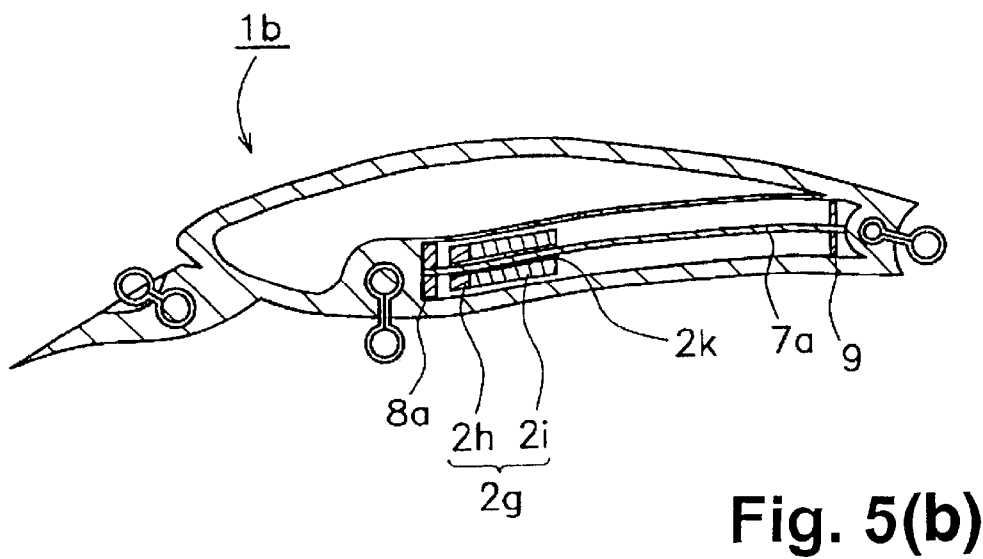
FIG. 5(b) is a cross-sectional view of another embodiment of a lure according to the present invention.

Various modifications can be made by those skilled in the art as long as they do not depart from the spirit of the present invention. For example, as shown in FIG. 5(b), wire 7a can be curved with a steel piece 8a secured to an end. Cylindrically shaped magnet piece 2h is attached to the end of weight 2g, which is disposed at the end of cylindrical tungsten alloy 2i. Alternatively, wire 7 or 7a, weight 2e, 2g, or 2j, and magnet piece 8 or steel piece 8a can be selectively combined to form a member for displacing the center of gravity according to the present invention. In the figures described above, the fish hooks are omitted from the lure.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also understood that the drawings are not necessarily drawn to scale, but they are merely conceptual in nature. It is the intention, therefore, to be limited only as indicated by the scope of the claims appended hereto.

What is claimed is:

1. A lure comprising:
    a main lure unit;
    a wire having a head end and a tail end, disposed longitudinally inside said main lure unit, and wherein said wire being a non-ferromagnetic material at room temperature;
    a weight being slidably disposed on said wire;
    a metal plate disposed proximate to said head end of said wire, wherein said metal plate being magnetically attachable to a magnet,
    a magnetic plate being slidably disposed on said wire between said metal plate and said weight, and
    a cushion member disposed proximate to said tail end of said wire, wherein said weight collides with said cushion member.

2. The lure as described in claim 1, wherein said weight having a specific gravity of about 12 to about 20.

3. The lure as described in claim 1, wherein said wire is selected from the group comprising phosphor bronze, a nickel-chrome alloy and a shape memory alloy.

4. The lure as described in claim 1, wherein said weight further comprises:
    an alloy having tungsten and about 1% to about 15% iron.

5. The lure as described in claim 1, wherein said magnet magnetically attaches to said metal plate and said weight.

6. A lure comprising:
    a main lure unit;
    a wire having a head end and a tail end, disposed longitudinally inside said main lure unit, and wherein said wire being a non-ferromagnetic material at room temperature;
    a weight being slidably disposed on said wire, wherein said weight being a ferromagnetic material;
    a metal plate disposed proximate to said head end of said wire, wherein said metal plate being magnetically attachable to a magnet;
    a cushion member disposed proximate to said tail end of said wire, wherein said weight collides with said cushion member; and
    a magnetic plate being slidably disposed on said wire between said metal plate and said weight, wherein said magnetic plate restricting the movement of said weight by magnetically attaching to said metal plate and said weight, and wherein said magnetic plate being alternately magnetically integral with said metal plate and said weight.

* * * * *